United States Patent
Bourn et al.

(10) Patent No.: US 11,010,808 B1
(45) Date of Patent: May 18, 2021

(54) SYSTEM AND MEDIUM FOR PROVIDING FINANCIAL PRODUCTS VIA AUGMENTED REALITY

(71) Applicant: United Services Automobile Association (USAA), San Antonio, TX (US)

(72) Inventors: Gary Don Bourn, Bulverde, TX (US); Adrian Borunda, Celina, TX (US); Josh Jason Medrano, San Antonio, TX (US); Cale Riley Spratt, Plano, TX (US); Austin Ray Graham, Plano, TX (US); Doyle Russell Dennis, Jr., La Vernia, TX (US); Kre-Sante Dior Gordon, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 15/933,005

(22) Filed: Mar. 22, 2018

Related U.S. Application Data

(60) Provisional application No. 62/526,848, filed on Jun. 29, 2017.

(51) Int. Cl.
*G06Q 30/00* (2012.01)
*G06Q 30/06* (2012.01)
*G06K 9/00* (2006.01)
*G06F 16/54* (2019.01)
*G06F 16/904* (2019.01)
(Continued)

(52) U.S. Cl.
CPC ........ *G06Q 30/0623* (2013.01); *G06F 16/54* (2019.01); *G06F 16/5866* (2019.01); *G06F 16/904* (2019.01); *G06K 9/00671* (2013.01); *G06Q 30/0643* (2013.01); *G06Q 40/00* (2013.01)

(58) Field of Classification Search
CPC .................. G06Q 30/0641; G06Q 30/0623
USPC .............................. 705/27.1, 26.61
See application file for complete search history.

(56) References Cited

U.S. PATENT DOCUMENTS

| | | | |
|---|---|---|---|
| 8,810,599 B1 * | 8/2014 | Tseng .................. | G05D 1/0278 345/633 |
| 10,140,553 B1 | 11/2018 | Vasisht et al. | |
| 10,235,602 B1 | 3/2019 | Vasisht et al. | |
| | | (Continued) | |

OTHER PUBLICATIONS

IIHS Issues Recommendations on Used Vehicles for Teens After Research Finds Many Aren't Driving the Safest Ones, Jul. 16, 2014, Targeted News Service (Year: 2014).*

*Primary Examiner* — Brittney N Miller
(74) *Attorney, Agent, or Firm* — Fletcher Yoder, PC

(57) ABSTRACT

A system may a processor that may receive image data of a vehicle via one or more image sensors and retrieve vehicle data regarding the vehicle from a vehicle database based on the image data. The vehicle database may include a first set of data regarding a plurality of vehicles. The processor may then retrieve financial data regarding a user from a financial database, such that the financial database includes a second set of data regarding financial information concerning the user. The processor may then determine one or more financial products associated with a purchase of the vehicle, generate one or more visualizations representative of the one (Continued)

or more financial products, and modify the image data depicted on a display to include the one or more visualizations.

14 Claims, 3 Drawing Sheets

(51) Int. Cl.
*G06F 16/58* (2019.01)
*G06Q 40/00* (2012.01)

(56) References Cited

U.S. PATENT DOCUMENTS

| | | | |
|---|---|---|---|
| 10,572,758 B1* | 2/2020 | Wilbert | G06T 5/10 |
| 2010/0106573 A1* | 4/2010 | Gallagher | G06Q 50/01 |
| | | | 705/14.4 |
| 2012/0230538 A1* | 9/2012 | Calman | G06Q 30/02 |
| | | | 382/103 |
| 2013/0085345 A1* | 4/2013 | Geisner | G06Q 30/00 |
| | | | 600/300 |
| 2014/0100994 A1* | 4/2014 | Tatzel | G06Q 30/0268 |
| | | | 705/27.1 |
| 2014/0267234 A1* | 9/2014 | Hook | G06T 19/006 |
| | | | 345/419 |

* cited by examiner

SYSTEM AND MEDIUM FOR PROVIDING FINANCIAL PRODUCTS VIA AUGMENTED REALITY

CROSS REFERENCE TO RELATED APPLICATION

This application claims priority to and the benefit of U.S. Provisional Application No. 62/526,848, entitled "SYSTEMS AND METHODS FOR PROVIDING FINANCIAL PRODUCTS VIA AUGMENTED REALITY," filed Jun. 29, 2017, which is hereby incorporated by reference in its entirety for all purposes.

BACKGROUND

The present disclosure relates generally to systems and methods for augmenting image data depicted on an electronic display. More specifically, the present disclosure relates to generating financial product offerings via the augmented image data on the electronic display.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

As mobile computing devices are used more readily to perform research and analysis, visualizations depicted on the displays of these mobile computing devices may provide more information to users to help enable them to make informed purchasing decisions. That is, mobile computing devices may retrieve information concerning various items by querying databases that include information regarding the items. As information becomes more readily available via network-based databases, it may be useful to automate the manner in which certain information is presented on the display.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may a processor that may receive image data of a vehicle via one or more image sensors and retrieve vehicle data regarding the vehicle from a vehicle database based on the image data. The vehicle database may include a first set of data regarding a plurality of vehicles. The processor may then retrieve financial data regarding a user from a financial database, such that the financial database includes a second set of data regarding financial information concerning the user. The processor may then determine one or more financial products associated with a purchase of the vehicle, generate one or more visualizations representative of the one or more financial products, and modify the image data depicted on a display to include the one or more visualizations.

In another embodiment, a non-transitory computer-readable medium comprising computer-executable instructions, when executed by a processor, cause the processor to receive image data of a vehicle via one or more image sensors, retrieve vehicle data regarding the vehicle from a vehicle database based on the image data, retrieve financial data regarding a user from a financial database, and determine one or more financial products associated with a purchase of the vehicle. The processor may then generate one or more visualizations representative of the one or more financial products and modify the image data depicted on a display to include the one or more visualizations.

In yet another embodiment, a method may include receiving, via a processor, image data of a vehicle via one or more image sensors. The method may also include using the processor to retrieve vehicle data regarding the vehicle from a vehicle database based on the image data, generate a virtual anchor comprising the vehicle data, and present the virtual anchor on a map layout graphic for display via an electronic display. The virtual anchor is interactive and configured to receive an input that causes the vehicle data to be depicted on the electronic display.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
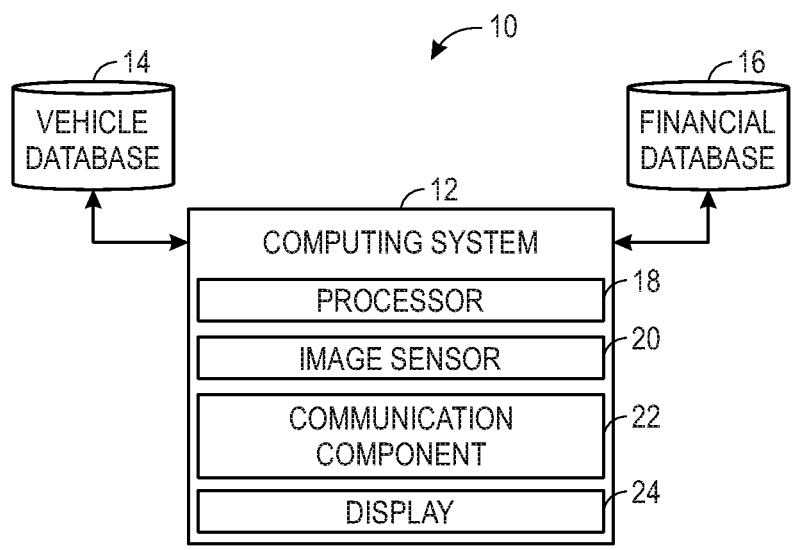
FIG. 1 illustrates a block diagram of a computing system communicatively coupled to a number of data sources, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The use of various electronic devices (e.g., smart phones) has enabled users to acquire information regarding the surrounding environment with relative ease. That is, the electronic devices may communicate with various databases to acquire information or data regarding a certain object and display the information via an electronic display for the user to view. In certain embodiments, image data acquired by image sensors of the electronic device may be modified to include data regarding the object being captured by the image data. The resulting image or augmented image data may be useful in presenting data regarding the object while also presenting the object in view of the user.

With the foregoing in mind, in certain embodiments, a computing system (e.g., smart phone) may receive image data via image sensors, such that the image data may include an image of a vehicle. The computing system may query a vehicle database based on the image data to determine vehicle data regarding the vehicle. The vehicle data may include information (e.g., type, make, model) regarding the vehicle. After identifying the vehicle data, the computing system may present the vehicle data via one or more icons or visualizations by modifying the image data being depicted via a display of the computing system. That is, the computing system may modify the image data being acquired by the image sensors in real time to include the visualizations regarding the vehicle data.

In addition, the computing system may query a financial database to acquire financial information regarding the user. The financial information may include a list of debts, an available amount of credit, account balances, and the like. Based on the financial information and the vehicle data, the computing system may generate one or more financial products that may be of interest to the user. The computing system may then modify the image data being presented on the electronic display to depict visualizations that include the financial product offerings. If the computing system receives a user input via a visualization depicted on the electronic display, the computing system may execute or open an application or program to enable the user to acquire the corresponding financial product.

As the user evaluates different vehicles, the computing system may generate virtual anchors that store the different information collected via the databases in a virtual space. The virtual space may be related to the position of the computing system with respect to the evaluated vehicles. The virtual anchors may be presented via an electronic display of the computing system to assist the user in finding the relative location of the vehicle and recall information related to the previously evaluated vehicles. Additional details regarding systems and methods for modifying image data depicted by a computing device to include one or more visualizations concerning financial products and virtual anchors will be described below with reference to FIGS. 1-4.

By way of introduction, FIG. 1 is a block diagram of a communication system 10 that includes a computing system 12, a vehicle database 14, and a financial database 16. Although the computing system 12 is illustrated as being coupled to just two databases in FIG. 1, it should be noted that the computing system 12 may be communicatively coupled to a variety of data sources that may assist the computing system 12 in performing the embodiments described herein. The computing system 12 may include any suitable computer device, such as a general-purpose personal computer, a laptop computer, a tablet computer, a mobile computer, and the like that is configured in accordance with present embodiments. The computing system 12 may include various types of components that may assist the computing system 12 in performing various types of computer tasks and operations. For example, the computing system 12 may include a processor 18, one or more image sensors 20, a communication component 22, and a display 24. In addition, the computing system 12 may also include a memory, a storage, input/output (I/O) ports, and the like.

The processor 18 may be any type of computer processor or microprocessor capable of executing computer-executable code. The processor 18 may also include multiple processors that may perform the operations described below.

The image sensor 20 may be a sensor capable of acquiring image data surrounding the computing device. As such, the image sensor 20 may be a camera or other suitable image capturing device. The communication component 22 may be a wireless or wired communication component that may facilitate communication between the computing system 12, database, and various other computing systems via a network, the Internet, or the like.

The display 24 may depict image data acquired by the image sensor 20 and visualizations associated with software or executable code being processed by the processor 18. In one embodiment, the display 24 may be a touch display capable of receiving inputs from a user of the computing system 12. The display 24 may be any suitable type of display, such as a liquid crystal display (LCD), plasma display, or an organic light emitting diode (OLED) display, for example. Additionally, in one embodiment, the display 24 may be provided in conjunction with a touch-sensitive mechanism (e.g., a touch screen) that may function as part of a control interface for the computing system 12.

The memory and the storage may be any suitable articles of manufacture that can serve as media to store processor-executable code, data, or the like. These articles of manufacture may represent computer-readable media (e.g., any suitable form of memory or storage) that may store the processor-executable code used by the processor 18 to perform the presently disclosed techniques. As used herein, applications may include any suitable computer software or program that may be installed onto the computing system 12 and executed by the processor 18. It should be noted that non-transitory merely indicates that the media is tangible and not a signal. The I/O ports may be interfaces that may couple to other peripheral components such as input devices (e.g., keyboard, mouse), sensors, input/output (I/O) modules, and the like.

It should be noted that the components described above with regard to the computing system 12 are exemplary components and the computing system 12 may include additional or fewer components as shown.

In certain embodiments, the computing system 12 may be communicatively coupled to the vehicle database 14 and the financial database 16 via the communication component 22. The vehicle database 14 may include a collection of images regarding various vehicles. For example, the images may include silhouette data regarding vehicles, shapes associated vehicles, raw images of vehicles, and the like. In one embodiment, the vehicle database 14 may also include data regarding various vehicles. The data may include details regarding the vehicles, such as an expected gas mileage, performance data regarding the vehicle, cost of the vehicle, additional images (e.g., internal views) regarding the vehicles, ratings (e.g., consumer, expert, safety) associated with the vehicle, and the like.

The financial database 16 may include financial or bank data associated with a user (e.g., user of the computing system 12). The financial database 16 may include financial data regarding the user, such as bank account information, credit information, loan information, credit rating information, and the like. In addition, the financial database 16 may also include a list of financial products that may be associated with the purchase or maintenance of a vehicle. For example, the financial products may include loans for purchasing a vehicle, insurance for a vehicle, and the like. In some embodiments, the financial database 16 may also include personal information regarding the user, such as the user's age, occupation, income, marital status, number of dependents, and the like. In some cases, this information may be available via a banking institution or may be determined based on the previous financial transactions associated with the user. By way of example, a server system with access to the financial database 16 may mine or analyze financial data associated with a user to determine whether a user has children based on purchases made by the user and the like.

In any case, a user of the computing system 12 may acquire image or video data of a vehicle by pointing the image sensor 20 to a vehicle located in the viewing presence of the computing system 12. In response, the display 24 may present image data of the vehicle being observed by the image sensor 20. In certain embodiments, the computing system 12 may use the acquired image data to query the vehicle database 14 and retrieve vehicle data regarding the vehicle. After retrieving the vehicle data, the computing system 12 may generate one or more visualizations to overlay the depicted image data of the display 24. The visualizations may include the vehicle data, and thus may provide information regarding the vehicle to the user.

In addition to the vehicle data, the computing system 12 may acquire financial data regarding the user via the financial database 16 described above. Using the financial database 16, the computing system 12 may determine one or more financial products that may be relevant to the user based on the financial data and the vehicle data. The computing system 12 may then generate visualizations that represent the financial products to overlay on the image data being depicted on the display 24. As such, the user may be provided relevant financial information related to purchasing and maintaining the vehicle currently being viewed in the presence of the computing system 12. This real-time retrieval and presentation of vehicle data and financial products may provide useful information to the user when evaluating whether to purchase the vehicle.

Figure 2:
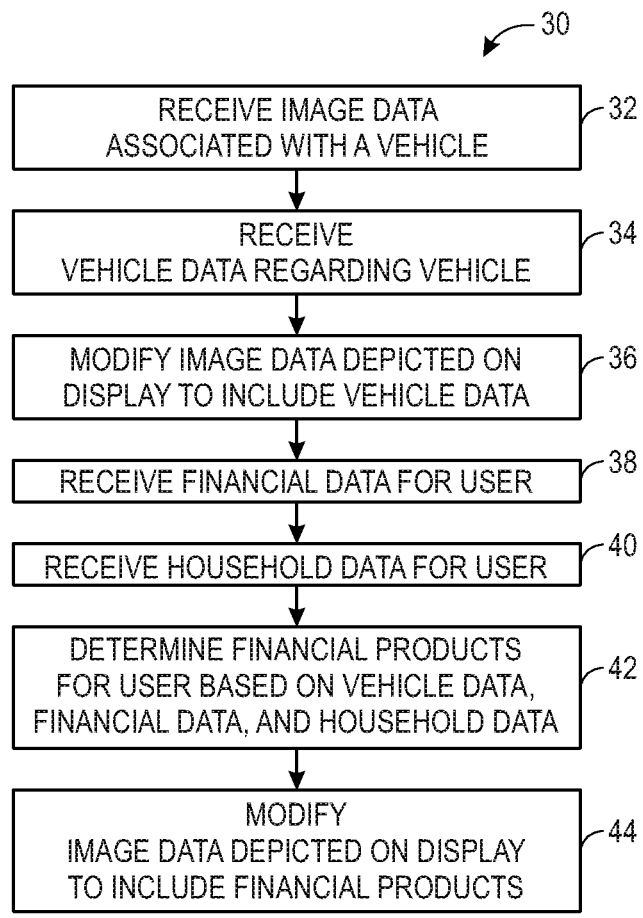
FIG. 2 illustrates a flow chart of a method for determining financial products based on the data acquired from the data sources of FIG. 1, in accordance with embodiments described herein.

Keeping the foregoing in mind, FIG. 2 illustrates an example method 30 that may be employed by the processor 18 of the computing system 12 to present various financial products associated with the purchase and/or maintenance of a vehicle. Although the following description of the method 30 is described as being performed by the processor 18, it should be noted that any suitable processor, processing device, or set of processors/processing devices may perform the method 30. Moreover, although the method 30 is described in a particular order, it should be understood that the method 30 may be performed in any suitable order.

Referring now to FIG. 2, at block 32, the processor 18 may receive image data associated with a vehicle. As such, in one embodiment, the processor 18 may receive image data being acquired by the image sensor 20 in real time. Alternatively, the processor 18 may receive image data of an image acquired at an earlier time.

At block 34, the processor 18 may receive vehicle data regarding the vehicle in the image data. In one embodiment, the processor 18 may use image recognition technology to infer or determine the type of vehicle present in the image data. As such, the image recognition technology may be capable of detecting the type of vehicle based on a variety of different images including the vehicle acquired from a variety of different angles and the like. In some embodiments, the processor 18 may query or search the vehicle database 14 for vehicle data that matches the image of the vehicle in the image data. In other embodiments, the vehicle database 14 may be managed by a server system that may receive the image data from the processor 18 and determine the relevant vehicle data for the vehicle depicted in the image data based on the data stored in the vehicle database 14. In this case, the server system may return the vehicle data to the processor 18.

Figure 3:
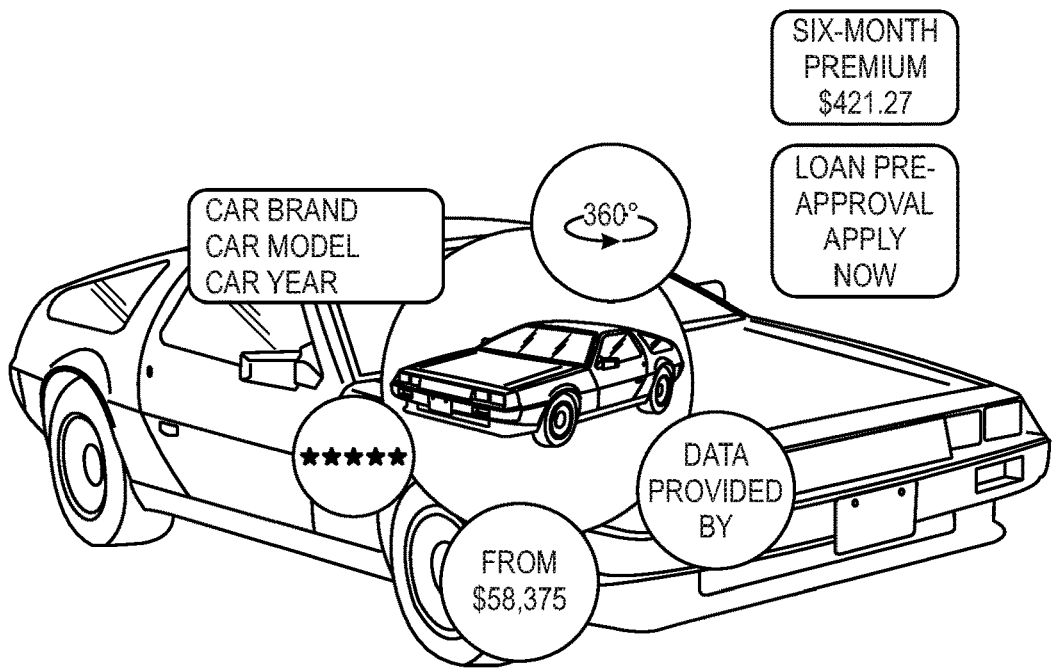
FIG. 3 illustrates an example visualization of image data depicted on a display of the computing device according to the method of FIG. 2, in accordance with embodiments described herein.

After receiving the vehicle data, the processor 18 may generate one or more visualizations (e.g., icons) that represents portions of the vehicle data. For example, the visualizations may provide make information, model information, year information, cost information, rating information, and the like regarding the vehicle of the image data. At block 36, the processor 18 may modify the image data depicted on the display 24 to include the visualizations. In one embodiment, the visualizations may be overlaid on top of the image data. By way of example, FIG. 3 illustrates sample visualizations that may be overlaid on image data that includes a vehicle. As shown in FIG. 3, the visualizations concerning the vehicle may include a stock photograph of the vehicle, an image of the inside of the vehicle, make and model information regarding the vehicle, a user rating of the vehicle, a safety rating of the vehicle, and a price of the vehicle. In some embodiments, each depicted visualizations may be capable of receiving a touch input that may cause the processor 18 to communicatively couple to a website, execute an application, or access a database and present additional information regarding the selected visualization.

Referring back to FIG. 2, at block 38, the processor 18 may receive financial data for the user of the computing system 12. As such, the processor 18 may query the financial database 16 to determine financial and/or insurance data related to the user. The financial data, as mentioned above, may include details regarding the financial status of the user. As such, financial data may include bank account balances, current debt, list of assets, and other information that may be useful in determining whether the user would qualify or be pre-approved for a loan to purchase the vehicle depicted in the image data.

In some embodiments, the financial data may include data relevant for insurance products and services. For example, the user may be associated with a risk profile that may be used to determine a cost to insure the vehicle by the user.

In addition, the financial database 16 may also include household data regarding the user. The household data may include information with regard to members of a household of the user. As such, the household data may detail whether the user has a spouse, a number of dependents associated with the user, and the like. With this in mind, at block 40, the processor 18 may receive the household data for the user. Although the household data is described as being received via the financial database 16, it should be noted that the household data may be received via any suitable data source.

At block 42, the processor 18 may determine financial products for the user based on the vehicle data, the financial data, the household, and the like. The financial products may include a loan to purchase the vehicle, an indication of pre-approval to purchase the vehicle, an insurance quote (e.g., property and casualty) to insure the vehicle, and the like. Generally, the processor 18 may analyze the received data to determine financial products that may be of interest to the user with respect to purchasing or leasing the vehicle depicted in the image data.

At block 44, the processor 18 may modify the image data depicted on the display 24 to include visualizations (e.g., icons, text box) that represent the different financial products being offered. In certain embodiments, each of the visualizations may be interactive features that the users may touch or provide an input thereon, thereby causing the processor 18 to initiate a subsequent action. For instance, after detecting an input at a particular visualization, the processor 18 may open an application that allows the user to access the represented financial product, gain more information regarding the represented financial product, or the like. In certain embodiments, the processor 18 may be directed to a website, which may open via a browser application or the like, to provide the user additional information regarding the respective product or to allow the user to apply for the respective product.

Although the foregoing discussion is provided with reference to a vehicle depicted in image data, it should be noted that the embodiments described herein may be implemented for other types of property, such as jewelry, firearms, electronics, and the like. As such, in addition to the financial products described above, the financial products may also include valuable personal property (VPP) insurance quotes, offerings, and the like. In some cases, if a user has an existing VPP policy, the user may use the image data acquired via the processor 18 to add the property depicted in the image data to the existing VPP policy via visualizations generated on the display 24.

In addition to the product offerings, in some embodiments, after receiving the vehicle data, the financial data, and the household data mentioned above, the processor 18 may determine one or more recommendations for the user with regard to the vehicle purchase. The recommendations may include other vehicles that may better suit the financial status of the user, other vehicles that accommodate other members of the household better, and the like. By way of example, if the household data indicates that the user has a minor child of driving age, the processor 18 may determine whether the vehicle present in the image data has a safety rating above a threshold. If the vehicle does not have a safety rating above the threshold, the processor 18 may query the vehicle database 14 to identify similar type of vehicles as compared to the vehicle in the image data that may have a safety rating above the threshold. The processor 18 may generate visualizations indicative of the recommended vehicles and overlay the visualizations on the image data depicted on the display 24 as discussed above.

After collecting the various types of information described above, the processor 18 may generate a virtual anchor that may store the collected information along with a location of the vehicle being evaluated. The virtual anchor may store global positioning system (GPS) coordinates of the vehicle or the location associated with the image of the vehicle. Alternatively, the virtual anchor may store a reference location of the vehicle or image of the vehicle, such that the reference location is relative to the location of the processor 18. In some embodiments, the vehicle may include a sensor or position tracking device that transmits a location reference (e.g., stored in a server, accessible via the Internet) to the processor 18. For example, the processor 18 may receive data from a radio frequency identification (RFID) tag from an RFID transmitter stored on the vehicle. The RFID tag may include a network location, such as an Internet site, that provides the real time location of the vehicle. Alternatively, the owner of the vehicle may regularly update the location of the vehicle in a database that may be accessible to the processor 18 based on information acquired from the vehicle.

In any case, as a user collects information concerning different vehicles or other objects, the processor 18 may generate virtual anchors for each of the vehicles or objects. The user may then revisit or relocate the researched vehicles by retrieving the respective virtual anchor. The processor 18 may provide relative directions that assist the user in tracking the relative location of the vehicle or object with respect to the computing system 12. As such, if a user is evaluating a number of vehicles at a car dealership that may have a collection of vehicles for sale, the processor 18 may provide the user the ability to retrieve vehicle information and financial information concerning different vehicles, generate virtual anchors that stores the retrieved information, and display the virtual anchors via the display 24. In this way, the user may review the collected information more efficiently and may return to a respective vehicle based on the respective virtual anchor.

Figure 4:
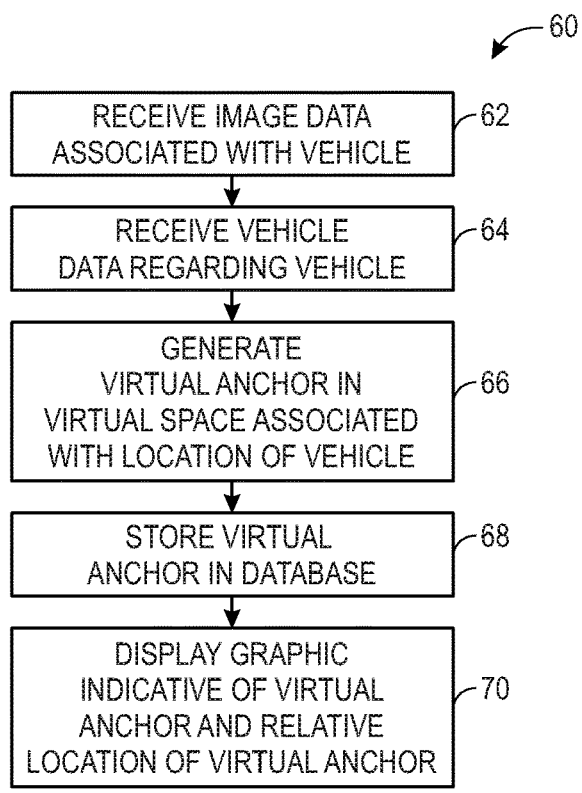
FIG. 4 illustrates a flow chart of a method for generating virtual anchors with vehicle information, in accordance with embodiments described herein.

With the foregoing in mind, FIG. 4 illustrates a flow chart of a method 60 for generating virtual anchors with information concerning vehicles, in accordance with the embodiments described herein. Although the following description of the method 60 is described as being performed by the processor 18 and in a particular order, it should be noted that the method 60 may be performed by any suitable processing device and in any suitable order.

Referring now to FIG. 4, blocks 62 and 64 may correspond to blocks 32 and 34 of the method 30 described above. As such, the processor 18 may receive image data associated with a vehicle and receive vehicle data regarding the vehicle based on the image data, as described above with reference to blocks 32 and 34. At block 66, the processor 18 may generate a virtual anchor in virtual space based on the location of the vehicle. In one embodiment, the location of the vehicle may be stored in a virtual space that is tracked by the processor 18. That is, the processor may generate a virtual location beacon and track the movement of the computing device 12 with respect to the virtual location beacon as the computing device 12 is transported or moves away from the vehicle. The virtual location beacon may enable the processor 18 to provide virtual directions or instructions for locating the vehicle after the user moves away from the vehicle. The processor 18, in some embodiments, may track the relative location between the computing system 12 and the virtual anchor using accelerometers, gyroscopes, and other suitable location deterministic tools that may be part of the computing system 12.

In addition to storing the location regarding a respective vehicle, the virtual anchor may store the vehicle data received at block 64. In one example, the virtual anchor may be data that may be stored or accessible by the processor 18 and the relative location information and/or the vehicle data may be stored as part of the respective data or part of metadata associated with the respective data.

At block 68, the processor 18 may store the virtual anchor in a database. As such, the processor 18 may send the virtual anchor to a database that may be accessible to other computing systems via a network, the Internet, or the like. In one embodiment, the user may designate whether the virtual anchor is accessible to others or privately available to himself. In some embodiments, the user may specify certain individuals or email addresses that may have access to the virtual anchor. By providing others access to the virtual anchors, the user may provide information to others regarding available vehicles, financing options available to the user, and the like. In turn, other individuals may compare information concerning different vehicles without physically visiting various car dealerships. In addition, other banking organizations may be able to view the financing options available to the user and may provide offers that may be competitive with the published offer that the user has received.

After storing the virtual anchor in the database, the processor 18 may, at block 70, display or present a graphic representing the virtual anchor on the display 24. In one embodiment, the processor 18 may present the graphics (e.g., icon) on a map layout that indicates a relative position of the virtual anchor with respect to the position of the computing system 12.

In addition, a number of graphics may be depicted on the display 24 to represent a number of virtual anchors that may have been generated according to the method 60. In some embodiments, virtual anchors generated by different users may also be presented on the display 26. These virtual anchors may be depicted in a different format (e.g., color, outline, graphic, icon) to denote that they originated from other users. In any case, the user of the computing system 12 may view additional details of the virtual anchors generated by the user or others by selecting a respective graphic presented on the display 26.

In some embodiments, the method 60 may be performed in conjunction with the method 30 described above. For instance, the processor 18 may generate virtual anchors that also store the financial products determined for the user at block 42 of the method 30. As such, the virtual anchors may include vehicle data and financial data for the user to review.

In addition, the data provided with the virtual anchors, processor 18 may also obtain additional data regarding the vehicle from other databases. For instance, a maintenance database may provide information with regard to maintenance reminders for a vehicle, recall information, and the like. As such, the processor 18 may assist an owner of the vehicle to own and maintain the vehicle using the image data that depicts the vehicle. The maintenance database may include information related to the user and the vehicle that the user owns. As maintenance is performed on the vehicle, the maintenance service provider may update the relevant data in the maintenance database. In addition, the maintenance service provider may include discount information or promotions in the maintenance database. As such, when the user views image data of the vehicle, the processor 18 may retrieve maintenance records to determine whether maintenance is needed for the vehicle based on the records and the current time, determine whether certain promotions apply to the user or the needed maintenance, and the like. The processor 18 may then present this information in an augmented reality on the image data containing the vehicle.

In the same way, the processor 18 may provide recall information by obtaining recall data regarding the vehicle from an electronic news source, the vehicle database, or the like. In another example, the processor 18 may receive product information or promotions for different products associated with the vehicle in the image data. For example, the processor 18 may receive promotions or service offerings for new tires, oil changes, and the like based on the image data. That is, the image data may be provided to a cloud-computing device or the like, which may analyze the image data to determine products (e.g., tires) that may be relevant to the vehicle in the image data. The processor 18 may receive the product information and generate a visualization to present on the image data related to the product information.

In some embodiments, the processor 18 may receive vehicle value information from a database based on the image data. As such, the processor 18 may provide vehicle value information on the image data in an augmented reality. In some embodiments, the processor 18 may provide the image data containing the vehicle to a cloud-computing device or the like, which may receive offers to purchase the vehicle from other individuals. The cloud-computing device may provide the offers to the processor 18, which may present the offers in the augmented reality space.

Figure 5:
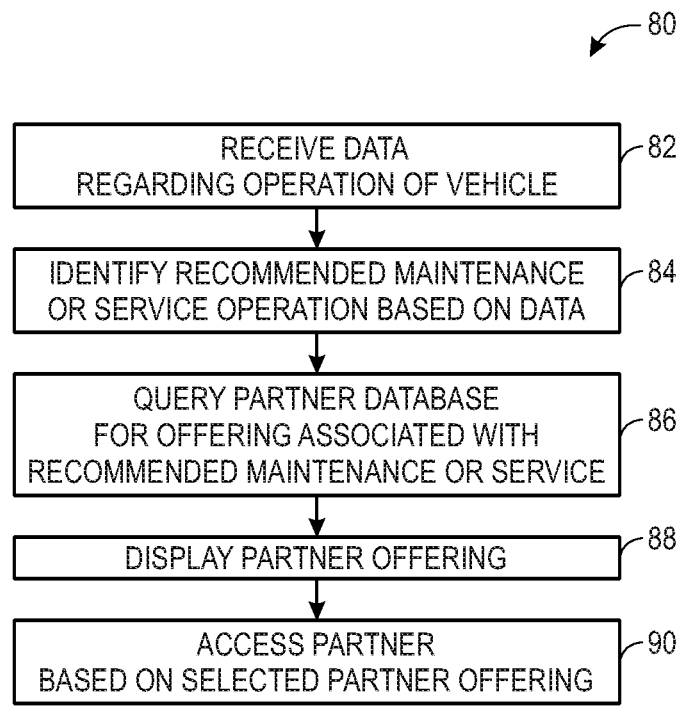
FIG. 5 illustrates a flow chart of a method for generating partner offerings based on vehicle data regarding the operation of a vehicle, in accordance with embodiments described herein.

With the foregoing in mind, FIG. 5 illustrates an example method 80 for providing product or service offerings from certain organizations based on data regarding the operation of the vehicle. Like the method 60 of FIG. 4, although the following description of the method 80 is described as being performed by the processor 18 and in a particular order, it should be noted that the method 80 may be performed by any suitable processing device and in any suitable order.

At block 82, the processor 18 may receive data regarding the operation of the vehicle. For example, the processor 18 may receive image data that includes details of the dashboard of a vehicle such as an odometer reading, a temperature reading, an oil life percentage, or the like. In some embodiments, sensors may be disposed on the vehicle to record or retrieve relevant data regarding the operation of the vehicle. The sensors may send the acquired data to the processor 18 at block 82.

In addition to sensors and meters disposed on a vehicle, the processor 18 may receive data regarding a manufacturer recall, a recommended service from a service provider (e.g., oil maintenance expected date, tire expected replacement date) via a database, cloud-based service, or the like. The additional information may be retrieved via electronic news sources or databases accessible via a network (e.g., Internet). In some embodiments, the processor 18 may query these data sources for information or news related to the vehicle. After identifying the relevant information concerning the vehicle, the processor 18 may request that the information holder send the relevant information to the processor 18. In this way, the processor 18 may maintain access to current information regarding recalls, updated service schedules, and the like for the vehicle.

In some embodiments, the processor 18 may receive image data that includes images of certain parts of the vehicle. For instance, an image of tires, windshield wipers, or the like may be provided to the processor 18 in accordance with the embodiments described herein.

At block 84, the processor 18 may identify any recommended maintenance or service operations based on the data received at block 82. That is, the processor 18 may review the information received at block 82 and determine whether the information corresponds to a recommended maintenance or service operation. In one embodiment, the processor 18 may cross reference the received data with a set of known service operations. By way of example, if the data indicates that the odometer reading is more than five thousand miles since the last received data and an oil change operation has not been detected as been performed, the processor 18 may identify that an oil change service operation should be performed for the vehicle. Other examples of recommended maintenance operations or service operations may include performing recall operations, tire changes, engine service operations, suspension service operations, air filter service operations, and the like.

After identifying recommended maintenance operations or service operations, at block 86, the processor 18 may query a partner database for offerings related to the recommended maintenance or service operations. The partners may include entities or organizations that may have access to the processor 18 or data available to the processor 18 to provide the processor 18 with information regarding the recommended maintenance or service operations. In one embodiment, the offerings may be stored on a database or the like accessible to the processor 18. In this way, the processor 18 may query the database for offerings related to the recommended maintenance or service operations identified in block 84.

In addition to the maintenance operations, the processor 18 may identify one or more products that may be of interest or useful for the vehicle owner. In this case, at block 86, the processor 18 may query a database for the products that have been identified as well.

The offerings identified at block 86 may include advertisements for the offerings, discounts for the offerings, a visualization indicative of the prices for offerings by different providers, and the like. The offerings may be indicative certain service providers that are preferred providers for the vehicle according to the manufacturer of the vehicle, an insurer of the vehicle, and the like.

After the offerings have been identified, the processor 18 may, at block 88, present or display the partner offerings via the display 24 or the like. As such, the processor may generate one or more visualizations that may be indicative of the offerings. The visualizations may be overlaid on the image data that the processor 18 is currently presenting in an augmented reality according to the embodiments described herein. In this way, the partner offerings may be presented on the display 24 to provide the user the ability to maintain his vehicle when capturing an image of the vehicle, a part of the vehicle, a control panel (e.g., dashboard) of the vehicle, and the like. In addition, the visualizations may be presented in a manner to include the underlying or original image data with the additional information overlaid on the image to provide the user with context for the offering visualization. Moreover, by presenting the visualizations in an augmented reality, the processor 18 may provide relevant information to a user within the limited space provide in the display 24 while maintaining the context of the vehicle or vehicle part in which the offerings are related to.

After displaying the partner offering visualizations, at block 90, the processor 18 may access a partner associated with a particular offering based on an input received via the display 24 or the processor 18. The input may be indicative of a selection by a user for a partner offering displayed at block 88. As such, the user may access a website of the partner, a scheduling application protocol interface (API) of the partner, or the like to enable the user to obtain the service or product offering presented to the user at block 88.

In some embodiments, information related to the recommended maintenance or service operations identified at block 84, the partners that were accessed at block 90, and other aspects of the method 80 may be stored in a memory, storage component, or database as a digital record of the maintenance history for the vehicle.

Although the method 80 has been described with respect to obtaining information for performing maintenance operations, service operations, or obtaining products for the vehicle, in some embodiments, the processor 18 may use a similar process to determine a value of the vehicle and query certain data sources for offers for the vehicle. Indeed, the digital record described above, along with the information collected via the method 80, may be employed to query vehicle dealerships or other vehicle purchasers for offers to purchase the vehicle. The offers may be presented via the display 24 in the same manner described above in block 88.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system, comprising:
a processor configured to:
receive image data representative of a first vehicle via one or more image sensors;
retrieve vehicle data regarding the first vehicle from a vehicle database based on the image data, wherein the vehicle database comprises a first set of data regarding a plurality of vehicles;
receive user data regarding a user associated with acquiring the image data, wherein the user data comprises:
financial data regarding the user, wherein the financial data is retrieved from a financial database comprising a second set of data regarding financial information concerning the user, wherein the financial information comprises an account balance, a debt amount, or both; and
household data associated with one or more individuals that reside with the user;
identify a second vehicle in the vehicle database and associated vehicle data for the second vehicle from a set of vehicles in the vehicle database based on the financial data and the household data, wherein the second vehicle is identified using the household data by:
determining whether the one or more individuals includes a minor;
determining a first safety rating associated with the first vehicle;
identifying a subset of the set of vehicles, wherein each vehicle of the subset is associated with a safety rating that is higher than the first safety rating; and
selecting the second vehicle from the subset in response to the one or more individuals including a minor;
determine one or more financial products associated with a purchase of the second vehicle based on the financial data of the user;
generate one or more visualizations representative of the one or more financial products associated with the purchase of the second vehicle;
retrieve one or more images of the second vehicle from the vehicle database; and
modify the image data depicted on a display to include the one or more visualizations and the one or more images of the second vehicle.

2. The system of claim 1, wherein the one or more visualizations are interactive and capable of receiving input via the display.

3. The system of claim 1, wherein the one or more visualizations are configured to communicatively couple the processor to a website configured to provide information regarding the one or more financial products.

4. The system of claim 1, wherein the one or more financial products comprise one or more loans for a purchase of the second vehicle, one or more insurance products for the second vehicle, or both.

5. The system of claim 1, wherein the processor is configured to generate a virtual anchor comprising the vehicle data.

6. The system of claim 5, wherein the virtual anchor is configured to indicate a first location of the processor when the image data of the first vehicle was acquired relative to a second location of the processor.

7. The system of claim 1, wherein the set of vehicles is obtainable for an offer via a financing option by the user based on the financial data.

8. A non-transitory computer-readable medium comprising computer-executable instructions that, when executed by a first processor, cause the first processor to:
  receive image data of a first vehicle via one or more image sensors;
  retrieve vehicle data regarding the first vehicle from a vehicle database based on the image data, wherein the vehicle database comprises a first set of data regarding a plurality of vehicles;
  receive user data regarding a user associated with acquiring the image data, wherein the user data comprises:
    financial data regarding the user, wherein the financial data is retrieved from a financial database comprising a second set of data regarding financial information concerning the user, wherein the financial information comprises an account balance, a debt amount, or both; and
    household data associated with one or more individuals that reside with the user;
  identify a second vehicle in the vehicle database and associated vehicle data for the second vehicle from a set of vehicles in the vehicle database based on the financial data and the household data, wherein the second vehicle is identified using the household data by:
    determining whether the one or more individuals includes a minor;
    determining a first safety rating associated with the first vehicle;
    identifying a subset of the set of vehicles, wherein each vehicle of the subset is associated with a safety rating that is higher than the first safety rating; and
    selecting the second vehicle from the subset in response to the one or more individuals including a minor;
  determine one or more financial products associated with a purchase of the second vehicle based on the vehicle data and the financial data of the user;
  generate one or more visualizations representative of the one or more financial products associated with the purchase of the second vehicle;
  generate one or more additional visualizations representative of one or more additional financial products associated with an additional purchase of the second vehicle;
  retrieve one or more images of the second vehicle from the vehicle database; and
  modify the image data depicted on a display to include the one or more visualizations and the one or more images of the second vehicle.

9. The non-transitory computer-readable medium of claim 8, wherein the vehicle database comprises a set of data regarding a plurality of vehicles.

10. The non-transitory computer-readable medium of claim 8, wherein the financial database comprises a set of data regarding financial information concerning the user.

11. The non-transitory computer-readable medium of claim 8, wherein the computer-executable instructions cause the processor to display a graphic with an additional indication of a user identity who created a virtual anchor.

12. The non-transitory computer-readable medium of claim 8, wherein the computer-executable instructions cause the processor to: receive an input indicative of a plurality of individuals being allowed to access a virtual anchor; and send an instruction to an anchor database to enable a portion of a plurality of computing devices to access the virtual anchor, wherein the portion of the plurality of computing devices correspond to the plurality of individuals.

13. The non-transitory computer-readable medium of claim 8, wherein the computer-executable instructions cause the first processor to modify a virtual anchor to include the one or more financial products.

14. The non-transitory computer-readable medium of claim 8, wherein the computer-executable instructions cause the first processor to present directions to the second vehicle based on a relative location.

\* \* \* \* \*